United States Patent Office 3,443,960
Patented May 13, 1969

3,443,960
SOUR CREAM WHIP
Peter P. Noznick, Evanston, and Charles W. Tatter, Homewood, Ill., assignors to Beatrice Foods Co., Chicago, Ill., a corporation of Delaware
No Drawing. Filed Aug. 10, 1965, Ser. No. 478,769
Int. Cl. A23c 9/12
U.S. Cl. 99—59  20 Claims

ABSTRACT OF THE DISCLOSURE

A whippable, acid flavored sour cream organism cultured food product is prepared comprising a fat, caseinate or soy protein, a calcium source, a buffer and a polyhydric alcohol partial ester of a higher fatty acid. The use of the calcium source gives a product having a firm body and which in powder form is stable on prolonged storage.

---

This invention relates to sour cream whips and more particularly to powdered artificial sour cream whips.

It is an object of the present invention to provide an artificial sour cream whip.

It is another object of the invention to provide an artificial sour cream whip which has excellent taste.

Yet another object of the invention is to provide a powdered food mixture which is stable on prolonged storage and which will give a sour cream whip when mixed with water and whipped.

It is a further object of the invention to provide an artificial sour cream whip which is substantially similar to natural sour cream.

Still other objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that the above objects can be achieved by using certain polyhydric alcohol esters of fatty acids as the whipping agents with a composition comprising water, a vegetable or animal oil or fat, a caseinate, lactose, a soluble citrate, calcium carbonate and a phosphate buffer and culturing the mixture by inoculation with an appropriate sour cream culture. Preferably, additional ingredients are present as indicated hereinafter.

The whipping agent can be added, if desired, after culturing, in which case the composition should be homogenized again after its addition.

Unless otherwise indicated all parts and percentages are by weight.

As indicated above, the powdered artificial sour cream whip of the present invention can be prepared by using certain polyhydric alcohol esters of fatty acids as the whipping agents with the composition described. Examples of the polyhydric alcohol esters of fatty acids which may be used in the present invention are the glyceryl esters, the glycol esters and polyglycerol esters of fatty acids of the types set forth below.

Examples of the glyceryl esters are glyceryl lacto monopalmitate, glyceryl lacto monooleate, glyceryl lacto monostearate and the like.

Examples of the glycol esters are propylene glycol monostearate, propylene glycol monopalmitate, propylene glycol monooleate, dipropylene glycol monostearate, dipropylene glycol monopalmitate, butylene glycol monostearate, butylene glycol monopalmitate, butylene glycol monooleate, and the like.

Although any fatty acid may be used as the acid component of the esters to be used in the invention, it is preferred to use the higher fatty acids, e.g., those containing 12 to 22 carbon atoms, such as lauric acid, palmitic acid, stearic acid and oleic acid.

With respect to the polyglycerol esters, while polyglycerol esters from diglycerol to triconto (30 glycerol units) glycerol esters of fatty acids can be employed there are preferably employed triglycerol to decaglycerol esters of higher fatty acids (e.g. containing 12 to 22 carbon atoms in the fatty acid). The most suitable polyglycerol esters are partial esters, i.e. they have one or more free hydroxyl groups and hence have both hydrophilic and lipophilic characteristics.

Examples of suitable polyglycerol esters are triglycerol monostearate, triglycerol monoshortening (triglycerol mono ester of the acids of cottonseed oil), triglycerol monooleate, hexaglycerol monostearate, hexaglycerol monoshortening, hexaglycerol monooleate, hexaglycerol dioleate, hexaglycerol dishortening, hexaglycerol hexaoleate, decaglycerol monostearate, decaglycerol monoshortening, decaglycerol monooleate, decaglycerol monolaurate, decaglycerol tristearate, decaglycerol trishortening, decaglycerol trioleate, decaglycerol trilinoleate, decaglycerol decastearate, decaglycerol decaoleate, decaglycerol decalinoleate, decaglycerol tetraoleate, diglycerol monostearate, dodecaglycerol hexapalmitate, decaglycerol tripalmitate, decaglycerol diarachinate, triglycerol mono behenate, dodecaglycerol trilignocerate, decaglycerol mono linolenate, hexaglycerol diricinoleate, decaglycerol deca myristate, decaglycerol tri ester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids.

The polyhydric alcohol esters of fatty acids to be used as the whipping agents is used in the present invention in an amount of about 0.3 to 10% and preferably about 1 to 5%, based on the entire weight of the powdered artificial sour cream whip on dry basis. Mixtures of these whipping agents can be used.

The composition to be used with the above whipping agents to make the powdered artificial sour cream whip is primarily a vegetable oil or fat and calcium carbonate. Preferably, this composition has the following ingredients:

| Material | Range (parts) | Preferred composition A (parts) |
|---|---|---|
| 92° coconut oil | 12–26 | 18.0 |
| Mono and diglycerides (SGF 104) | 0.1–5 | 0.4 |
| Lecithin | 0.05–5 | 0.1 |
| Guar gum | 0.01–1 | 0.2 |
| Sodium caseinate | 1–7 | 3.0 |
| Lactose | 2–8 | 4.5 |
| Citric acid hydrate | 0.05–1 | 0.3 |
| Calcium carbonate | 0.05–0.75 | 0.2 |
| Dipotassium phosphate | 0.05–1 | 0.2 |
| Whipping agent | 0.1–3.3 | 0.75 |

The above composition including the whipping agent mal be mixed with about 55 to 80 parts of water to make a substantially homogeneous mixture. The mixture is then dried, preferably by spray drying to obtain the powdered artificial sour cream whip of the present invention.

As the fat there can be used vegetable oils, including polyunsaturated oils, either hydrogenated or not. Among the suitable edible fats which can be used are cottonseed oil, safflower oil, corn oil, soybean oil, butterfat, coconut oil, peanut oil, lard, hydrogenated cottonseed oil, hydrogenated corn oil, hydrogenated soybean oil, hydrogenated peanut oil, olive oil, hydrogenated olive oil, hydrogenated coconut oil, e.g. hydrogenated to a melting point of 92° F.

As the emulsifier for the above composition there is preferably employed a mixture of lecithin and mono and diglycerides although either can be used alone. The combination of emulsifiers gives better balance to the composition than either alone. The emulsifiers aid in stabilizing the product. The mono and diglycerides is a commercial product containing 40–42% mono, 43–45% diglycerides and the remainder triglycerides.

The guar gum is not essential, particularly for the spray dried product. However, it adds to the body of the liquid product and gives more firmness to the product. In place of guar gum there can be employed other bodying agents such as carboxymethyl cellulose, modified starches, sodium alginate and potassium alginate.

In place of sodium caseinate there can be used potassium caseinate or ammonium caseinate or soy protein, e.g., sodium soy proteinate.

The citric acid hydrate is used to provide the acid medium. There can be employed anhydrous citric acid or sodium citrate. In place of citric acid other non-toxic acids can be used.

The dipotassium phosphate is a buffer. There also can be used disodium phosphate or diammonium phosphate in place thereof. Other buffers for the calcium are sodium citrate, sodium citrate-citric acid, sodium phosphate, sodium phosphate-phosphoric acid, dipotassium phosphate-mono potassium phosphate, ammonium citrate, dipotassium phosphate-citric acid. The pH of the emulsion prior to inoculation with the sour cream culture organism should normally be 5.5 to 7.5 and is preferably on the acid side.

Calcium carbonate is the preferred source of calcium since it releases its calcium gradually and gives a product having a real firm body.

It is essential that the source of calcium be either in a form substantially insoluble in water or that it be present in an amount of not over 0.1% of the total solution weight and preferably buffered enough before inoculation with the bacteria such that the emulsion has a pH of at least 5.5 and preferably 6.0 to 7.5. Too high an initial free calcium source and/or too low an initial acidity has been found to retard the growth of the essential microorganisms. The calcium should be released slowly.

Calcium, lactate, calcium gluconate, calcium hydroxide, calcium chloride, calcium sulfate and tricalcium phosphate are examples of other calcium sources which can be employed in dilute solutions.

Any conventional sour cream organism culture or mixture of cultures can be used. Thus there can be employed Klenzade No. 5 which is a mixture of streptococcus lactis and streptococcus cremoris. Other suitable organisms include streptococcus cremoris, streptococcus lactis, streptococcus citrovorus, streptococcus para citrovorus and lactobacillus casei. Commercial cultures of these types include Klenzade No. 3 and No. 9 and Chris Hansen's No. 12.

Example I

The preferred composition A set forth above was mixed together as follows:

The fat and the mono and diglycerides were melted together and then the lecithin added. The remaining and non-fat ingredients were mixed with about 73.1 parts of water. As the whipping agent there was used glyceryl lacto monopalmitate. Then the fat mixture was added to the water mixture and the entire mixture heated to 145° F. This mixture was next pasteurized in conventional fashion at 160–170° for 30 minutes and homogenized at 1500 and cooled to 70° F. The homogenized mixture was cultured by inoculating with Klenzade No. 5 culture at a 3% level (liquid basis) and allowed to set at 70° F.±2° F. for 16 hours and then cooled to 40° F.

The mixture was then pasteurized at 140–150° F. for 30 minutes, homogenized at 500 p.s.i. and spray dried using a large orifice to obtain a powder.

To 150 grams of the powdered sour cream whip made above there were added 350 grams of water. The liquid mixture was mixed and whipped with an electric "egg beater." An imitation sour cream flavored whip was thus made which had a taste very similar to natural sour cream.

Example Ia

Example I was repeated but the whipping agent was omitted from the composition and instead was added after the culturing and prior to the second pasteurization to give a product similar to that obtained in Example I.

Example II

Example I was repeated except that 0.75 part of propylene glycol monostearate was substituted for the glyceryl lacto monopalmitate. Results similar to Example I were obtained.

Example III

Example I was repeated except that 1.5 parts of decaglycerol tristearate were substituted for the 0.75 part of glyceryl lacto monopalmitate. A good imitation sour cream whip was again obtained.

According to the present invention the homogenization after culturing can be at relatively low pressures, e.g., 500–1,000 p.s.i. although higher pressures can be used if desired.

Example IV

Example I was repeated except that the cultured artificial sour cream liquid mixture, after the second pasteurization and homogenization step, was whipped without the spray drying step. The imitation sour cream whip so obtained was similar to that made under Example I.

From the above examples it can be gathered that the artificial sour cream product of the present invention can be in the form of a liquid or a powder. Generally, for economic reasons, it is preferred to have the product in the powdered or concentrated form.

What is claimed is:

1. A process for preparing a whippable acid flavored food product comprising:
   mixing a vegetable fat, a member of the group consisting of mono and diglycerides, lactose, calcium carbonate, a water soluble non-toxic caseinate, water and a buffer,
   heating the mixture to 145° F.,
   pasteurizing and homogenizing the mixture, cooling the mixture, culturing the mixture with a sour cream organism, adding a whipping agent of the group consisting of glyceryl lacto partial higher fatty acid esters, glycol mono higher fatty acid esters and polyglycerol partial esters of higher fatty acids either before or after culturing, and pasteurizing and homogenizing the final mixture.

2. A process according to claim 1 further comprising spray drying the final mixture to form a powdered product.

3. A process according to claim 1 wherein the whipping agent is added before culturing.

4. A process according to claim 1 wherein the whipping agent is added after culturing.

5. A whippable, acid flavored food product consisting essentially of
   (1) a sour cream substitute prepared by mixing together a fat, an emulsifier, lactose, a water soluble protein compound from the group consisting of a non-toxic caseinate and soy protein, water, a source of calcium selected from the group consisting of calcium carbonate, calcium lactate, calcium gluconate, calcium hydroxide, calcium sulfate, calcium chloride and tricalcium phosphate capable of supplying up to 0.1% of calcium in aqueous solution, a non-toxic acid and a buffer in an amount to give a pH between 5.5 and 7.5 and culturing with a sour cream organism, and (2) a non-toxic polyhydric alcohol partial ester of a higher fatty acid whipping agent.

6. A food product according to claim 5 in powdered form.

7. A product according to claim 5 wherein the fat is a vegetable fat and the polyhydric alcohol partial ester is selected from the group consisting of glyceryl lacto partial higher fatty acid esters, glycol mono higher fatty acid esters and polyglycerol partial esters of higher fatty acids.

8. A powdered food product according to claim 7 including a bodying agent selected from the group consisting of guar gum, carboxymethyl cellulose, modified starches and a non-toxic algenate.

9. An artificial sour cream whip prepared by whipping an aqueous mixture of the powdered food product of claim 8.

10. A powdered food product according to claim 7 including mono and diglycerides.

11. A powdered food product according to claim 7 including lecithin.

12. A powdered food product according to claim 7 wherein the buffer is a phosphate.

13. A powdered food product according to claim 7 wherein the vegetable fat is coconut oil.

14. A powdered product according to claim 7 wherein the vegetable fat is 12 to 26 parts, the emulsifier is 1.1 to 10 parts and is selected from the group consisting of lecithin and mono and diglycerides, the protein compound is a soluble non-toxic caseinate in amount of 1–7 parts, the lactose is 2–8 parts, the calcium compound is 0.05 to 0.75 part, the buffer is a phosphate buffer in an amount of 0.05–1 part and the fatty acid partial ester is present in an amount of 0.1–6 parts.

15. A powdered food product according to claim 14 including 0.05–1 part of a member of the group consisting of citric acid and water soluble non-toxic salts thereof.

16. A powdered food product according to claim 14 wherein the partial fatty acid ester is glyceryl lacto mono ester of a fatty acid having 16–18 carbon atoms.

17. A powdered food product according to claim 14 wherein the partial fatty acid ester is propylene glycol mono ester of a fatty acid having 16–18 carbon atoms.

18. A powdered food product according to claim 14 wherein the partial fatty acid ester is a polyglycerol partial ester of a fatty acid having 16–18 carbon atoms.

19. A whippable food product according to claim 5 wherein the calcium source is calcium carbonate.

20. A product according to claim 19 wherein the partial fatty acid ester comprises a member of the group consisting of glycerol lacto partial higher fatty acid esters, glycol mono higher fatty acid esters and polyglycerol partial esters of higher fatty acids.

References Cited

UNITED STATES PATENTS

| | | | |
|---|---|---|---|
| 3,391,002 | 7/1968 | Little | 99—54 |
| 3,397,994 | 8/1968 | Elenbogen et al. | 99—144 X |
| 3,090,688 | 5/1963 | Noznick et al. | 99—59 X |
| 3,199,988 | 8/1965 | Kozlik et al. | 99—139 |
| 3,235,387 | 2/1966 | Stumbo et al. | 99—59 |
| 3,314,798 | 4/1967 | Graves | 99—59 X |
| 3,355,298 | 11/1967 | Loter | 99—54 |
| 3,359,116 | 12/1967 | Little | 99—54 |

LIONEL M. SHAPIRO, *Primary Examiner.*

D. M. NOFF, *Assistant Examiner.*

U.S. Cl. X.R.

99—56, 63, 64